(12) United States Patent
Brown et al.

(10) Patent No.: US 7,287,667 B2
(45) Date of Patent: Oct. 30, 2007

(54) DISPENSING CANISTER WITH INDEXING MEANS

(75) Inventors: Keith DeLawrence Brown, Montclair, NJ (US); Michael Circosta, New York, NY (US)

(73) Assignee: Helen of Troy Limited, St. Michael (BB)

( * ) Notice: Subject to any disclaimer, the term of this patent is extended or adjusted under 35 U.S.C. 154(b) by 266 days.

(21) Appl. No.: 11/128,833

(22) Filed: May 13, 2005

(65) Prior Publication Data

US 2006/0255059 A1 Nov. 16, 2006

(51) Int. Cl.
*B65H 1/08* (2006.01)
*B65D 85/00* (2006.01)

(52) U.S. Cl. .................. 221/227; 221/57; 206/391

(58) Field of Classification Search ............... 206/225, 206/394, 233, 391, 812; 221/269, 270, 268, 221/271, 274, 302, 280, 279, 227, 231, 52, 221/56, 57, 58, 59; 241/559.4, 560, 560.1
See application file for complete search history.

(56) References Cited

U.S. PATENT DOCUMENTS

| | | | |
|---|---|---|---|
| 2,534,290 A | 12/1950 | Moskowitz |
| 3,275,133 A | 9/1966 | Wood |
| 3,316,040 A | 4/1967 | McGann |
| D237,232 S | 10/1975 | Garrett, Jr. |
| 4,177,958 A | 12/1979 | Poole |
| 4,192,561 A | 3/1980 | Gunn |
| 4,273,392 A | 6/1981 | Stinson |
| 4,314,679 A | 2/1982 | Paul et al. |
| 4,432,451 A | 2/1984 | Hooser |
| 4,463,912 A | 8/1984 | Grunerud |
| 4,607,809 A | 8/1986 | Sineni et al. |
| 4,765,475 A | 8/1988 | Kaysserian |
| D306,946 S | 4/1990 | Merdic |
| D307,086 S | 4/1990 | Van Marcke et al. |
| 4,948,103 A | 8/1990 | Bowden et al. |
| D314,301 S | 2/1991 | Cooke |
| 5,104,001 A | 4/1992 | Negron |
| 5,165,124 A | 11/1992 | Li |
| 5,518,223 A | 5/1996 | Bivens |
| D378,641 S | 4/1997 | Beckenlehner et al. |
| 5,887,818 A | 3/1999 | Kelley |
| 6,050,401 A | 4/2000 | Michaelson |
| D430,984 S | 9/2000 | Camarena |
| 6,193,059 B1 | 2/2001 | Massaro |
| 6,422,503 B1 | 7/2002 | Hoo Kong |
| 6,715,637 B1 | 4/2004 | Ramos |
| 6,843,369 B2 | 1/2005 | Daniels et al. |
| 2004/0069894 A1 | 4/2004 | Murawski |

*Primary Examiner*—Gene O. Crawford
*Assistant Examiner*—Timothy Waggoner
(74) *Attorney, Agent, or Firm*—Seyfarth Shaw LLP (57) ABSTRACT

The present invention provides for a canister and an indexing apparatus that provides for automatic positioning of items in predetermined indexed positions when items are added or removed therefrom, without need of an external tab or positioning member to be adjusted by a user's hand. Merely by adding or removing the items to or from the canister, the items are automatically positioned. A pole having a track with positioning members receives a finger of a platform that rides in the track and automatically adjusts the platform's position when items are placed on or removed from the platform.

20 Claims, 5 Drawing Sheets

DISPENSING CANISTER WITH INDEXING MEANS

The present invention pertains to a canister for dispensing items, such as toilet paper rolls, having a track with a positioning member in order to orient the items within the canister in predetermined positions.

Canisters are well known in the art for holding and dispensing items such as paper towels and toilet paper rolls. Such dispensers allow for the storage of the rolls in a neat and fashionable way, but also allow for the items to be easily removed for usage. Canisters for storing toilet paper rolls are known that have a central rod and a cylindrical housing surrounding the rod. Multiple rolls of toilet paper are mounted over the rod and may be stored within the housing. Such canisters are known that have a platform that is mounted over the rod which is spring loaded in order to push the toilet paper rolls upward toward the top of the canister in order to dispense the toilet paper rolls. Some known canisters allow for adjustment of the platform, but require manual adjustment by a user's hand operating a tab extending out of the canister housing. However, it has not been known to have a simple means of automatically indexing the canister so that the canister may actuate the positioning of an item, such as toilet paper rolls, based on the number of rolls within the canister. Such an indexing means would be desired so that upon removal of one toilet paper roll the canister automatically repositions the remaining rolls so that they may be easily accessed and dispensed for later usage. It is also desirable to provide a canister that is quickly and easily assembled and has positioning means for quickly and easily positioning items within the canister.

SUMMARY

In an embodiment, the present invention provides for a canister that comprises a vertical pole having a track with a positioning member, a platform including a collar having a bore for mounting over the pole, a finger protruding from the collar and received in the track, a spring disposed on the pole for biasing the platform and the finger engaging the positioning member in order to counteract the force of the spring and hold the platform in a predetermined position. In an embodiment, the canister may provide a housing having a base and a lid and the lid is attached at a top of the housing. In an embodiment, the vertical pole may extend between the lid and the base and the positioning member may include a notch and a detent. In an embodiment, the spring may be disposed on the pole at the base.

In an embodiment, the platform may include a rim that receives rolls of toilet paper that have been placed over the pole and onto the platform and the positioning members are separated a distance approximately equal to a height of the rolls, so that each roll may be located adjacent a top of the canister and dispensed therefrom. In an embodiment, the track may extend along the length of the pole between a lid and a base and may include at least two positioning stations where the track is bifurcated and each station may have a positioning member. In an embodiment, the canister may comprise a swing arm pivotally attached to the collar and the swing arm may have the finger protruding transverse to the arm at its terminal end for riding in the track.

In an embodiment, the finger may be interaction shaped in order to engage a corresponding shaped portion of the track. In an embodiment, the finger is diamond shaped and is locked by a first positioning member and may hold the platform in a first position on the pole within the canister. In an embodiment, the canister may comprise a plurality of toilet paper rolls mounted on the platform and wherein upon removal of the upper most roll of toilet paper and pushing down slightly on the platform, the diamond shaped finger may be pushed downward away from the first positioning member in order to allow the platform to move upward.

In an embodiment, the canister may comprise at least two positioning stations and each positioning station may include a positioning member, an upward track and a bifurcated downward track. In an embodiment, the canister may comprise a main vertical track extending between positioning stations and the upward track and downward track of the first station may meet at an apex that forms a slanted area which engages the finger that pushes the finger toward the downward track so that the platform may ride downward toward the next positioning station. In an embodiment, the positioning station may include an inclined surface that will force the finger to the upward track toward a positioning member for receiving the finger in order to lock the platform in position. In an embodiment, the platform may be released from the positioning station by pushing down slightly on the platform so that the finger of the swing arm is released by the positioning member and gravity acts on the swing arm to move the arm to a vertical position so that the finger locates in the main track and the platform may ride upward along the main track.

In an embodiment, upon pushing down on the platform to move it downward along the track, the swing arm's finger may engage the inclined surface so that the finger may ride in the downward track until the swing arm reaches the next station. In an embodiment, the finger may locate the platform at a first station so that all three toilet paper rolls may be suspended in position inside the canister.

In an embodiment, a method of dispensing an item from a canister may be provided comprising the steps of providing a vertical pole having a track with a plurality of positioning members, mounting a platform on the pole, the platform having a collar with a finger protruding therefrom and received in the track and disposed in a first positioning member in order to lock the platform in a first position, pushing down on the platform in order to remove the finger from the first member, biasing the platform upward by a spring causing the finger to rider upward in the track and latching the finger by a second positioning member in order to lock the platform in a second position. The method may further comprise the steps of engaging the finger at an incline surface of the track and providing a bifurcated section of the track forming a first position station and guiding the finger into an upward track or downward track.

The method may further comprise the steps of guiding the finger into a downward track while pushing the platform down and guiding the finger into the upward track via the bias force of the spring pushing the platform upward. The method may further comprise the steps of loading at least two toilet paper rolls on the platform and the weight of the rolls counteracting the upward force of the spring and pushing the platform downward and latching the finger by a first positioning member so that the top roll that is stacked on a lower roll is located adjacent a top the canister and the platform is locked in a first position, removing the top roll by pushing down slightly in order to release the finger from the first positioning member, reorienting the finger that is attached to a swing arm via the force of gravity pulling the swing arm to a vertical position and locating the finger along the main track, riding the main track via the finger to move the platform and the lower roll upward along the pole in order to reposition the lower roll at the top of the canister and latching the finger in a second positioning member in order to lock the platform in a second position.

BRIEF DESCRIPTION OF THE DRAWINGS

For the purpose of facilitating an understanding of the subject matter sought to be protected, they are illustrated in the accompanying drawings embodiments thereof, from an inspection of which, when considered in connection with the following description, the subject matter sought to be protected, its construction and operation, and many of its advantages should be readily understood and appreciated.

DETAIL DESCRIPTION

FIGS. 1-7 depict an embodiment of a canister 10 of the present invention. The canister 10 includes a housing 15 having a base 17 and lid 18. In an embodiment, the lid 18 is attached to the housing 15 by a hinge 19. A latch 20 is provided which may provide a snap-fit with the top edge 21 of the housing 15 in order to latch the lid 18 in a closed position. Upon downward pressure, the latch 20 may be released from the top edge 21 so that the lid 18 may be pivoted upward. In an embodiment, the hinge 19 includes a spring which biases the lid 18 to automatically open when the latch 20 is released.

Figures 1, 2:
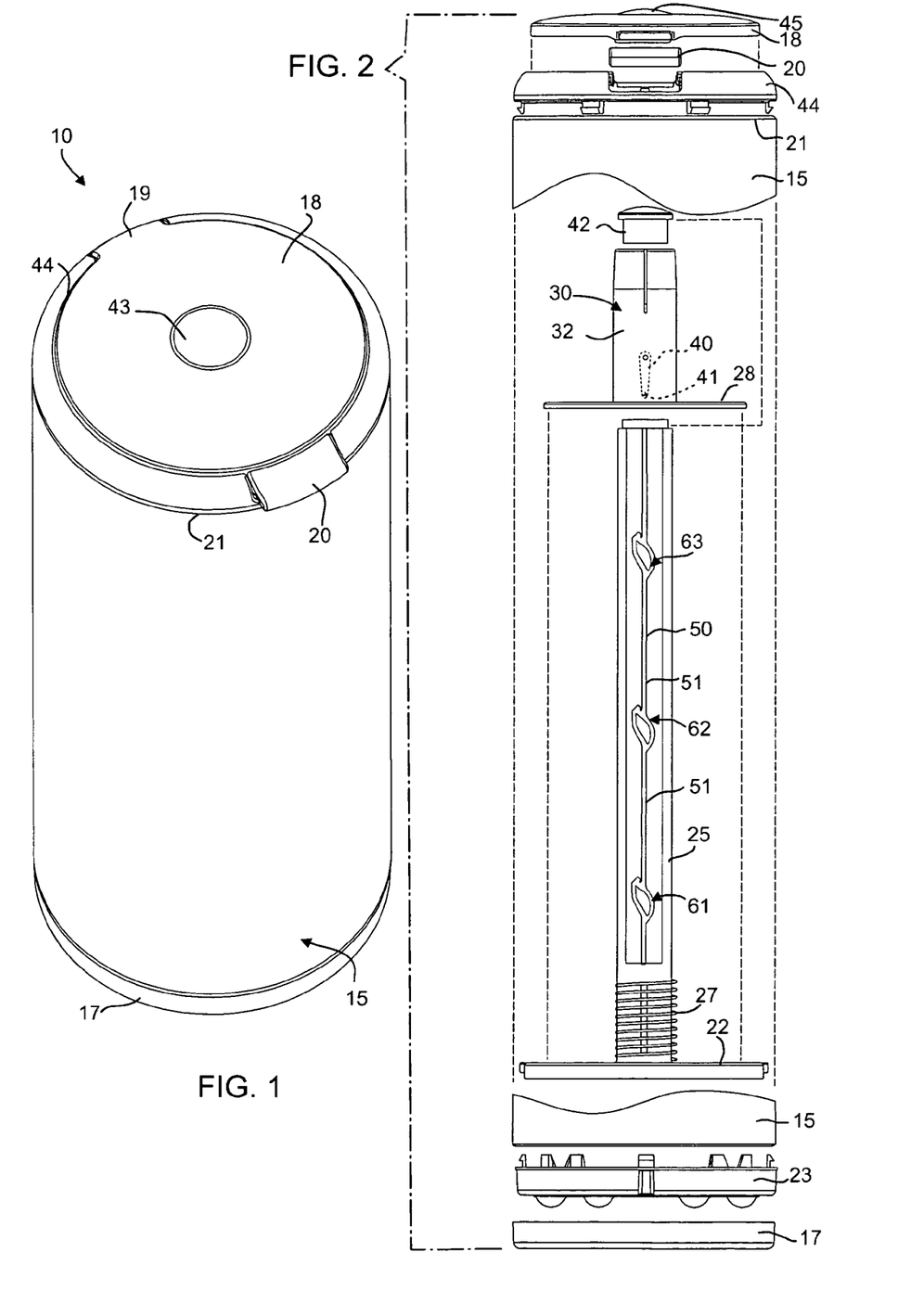
FIG. 1 is a perspective view of the canister of the present invention.
FIG. 2 is an exploded side view of the canister of FIG. 1, partially cut away.

The components of the inner assembly of the canister 10 are depicted in an exploded view in FIG. 2. Mounted to the base 17 is an internal base 23. The internal base 23 may include snap-fit tabs to engage the inner wall of the housing 15 in order to attach the base 17 and internal base 23 to the housing 15. Attached to the internal base 23 is support 22 to which a vertical pole or rod 25 is attached. Mounted on the pole is a coil spring 27 or bias member, which slides down to the bottom of the pole 25 and is maintained on the pole by the support 22. Formed vertically along the pole is a guide slot 29 (FIG. 7), which will be discussed in more detail below.

Figure 3:
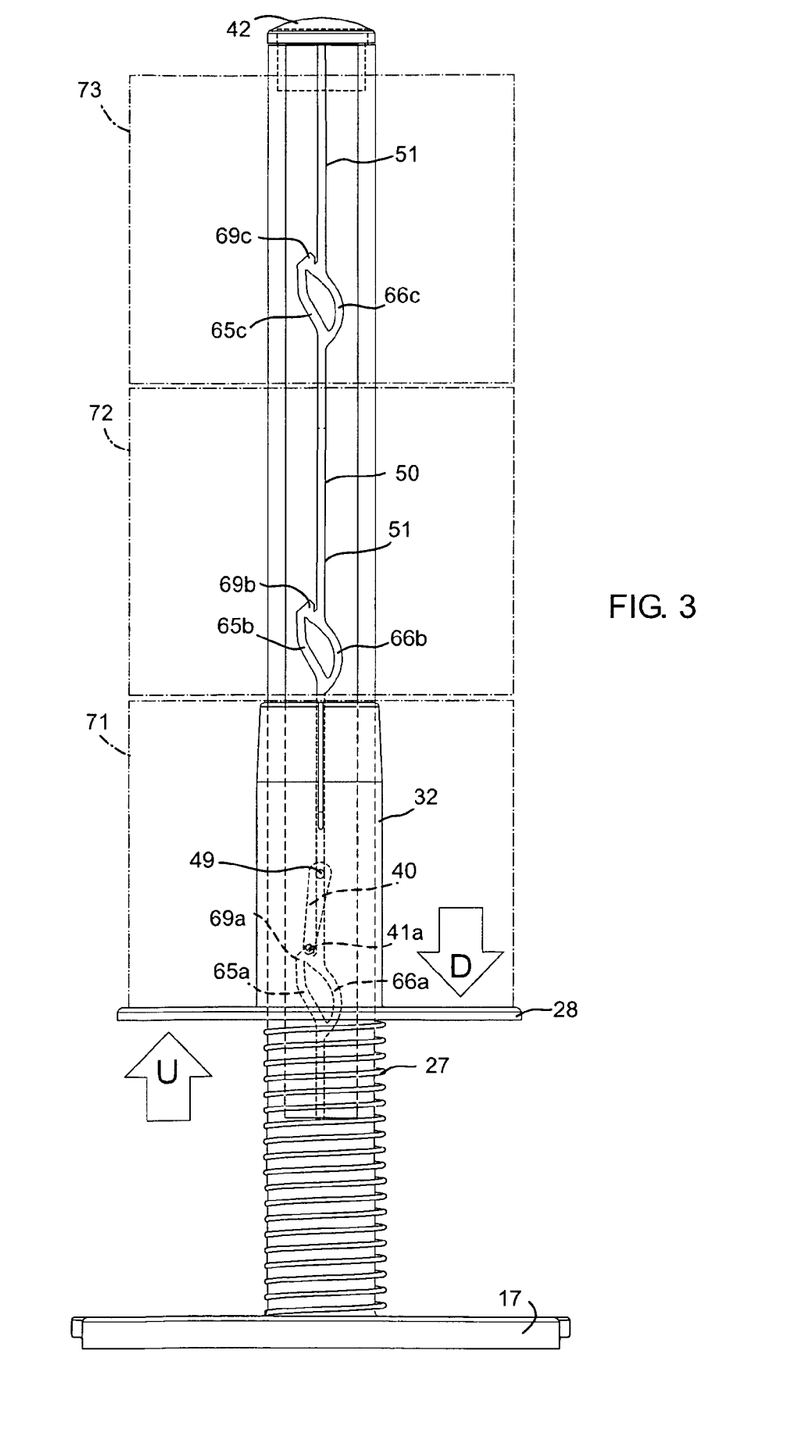
FIG. 3 is a side view of the internal components of the canister of FIG. 2 assembled and depicting toilet paper rolls.

A platform 30 is provided having a collar 32 and a circular rim 33. In an embodiment, the collar 32 is cylindrical and forms a bore 33 (FIG. 7) that has a diameter slightly larger than the outer diameter of the pole 25, so that the collar 32 may ride freely up and down the pole 25. In an embodiment, the outer diameter of the collar 32 is slightly smaller than the diameter of the core of a toilet paper roll, so that a roll may be placed onto the collar 32 and supported by the rim 28. Thus, as shown in FIG. 3, the platform 30 may act to hold and position toilet paper rolls 71, 72, 73 along the pole 25 within the canister 10.

The inner diameter of the collar 32 has a swing arm 40 mounted therein. The swing arm 40 includes a finger 41, which will be described in greater detail below. A cap 42 is provided for mounting to the top of the pole 25 and prohibits the platform 30 from sliding off the top of the pole 25. A button 43 is mounted to the lid 18 and a bezel 44 mounts to the top of the housing 15 via snap-fit tabs. The bezel 44 surrounds the lid 18.

Figure 5:
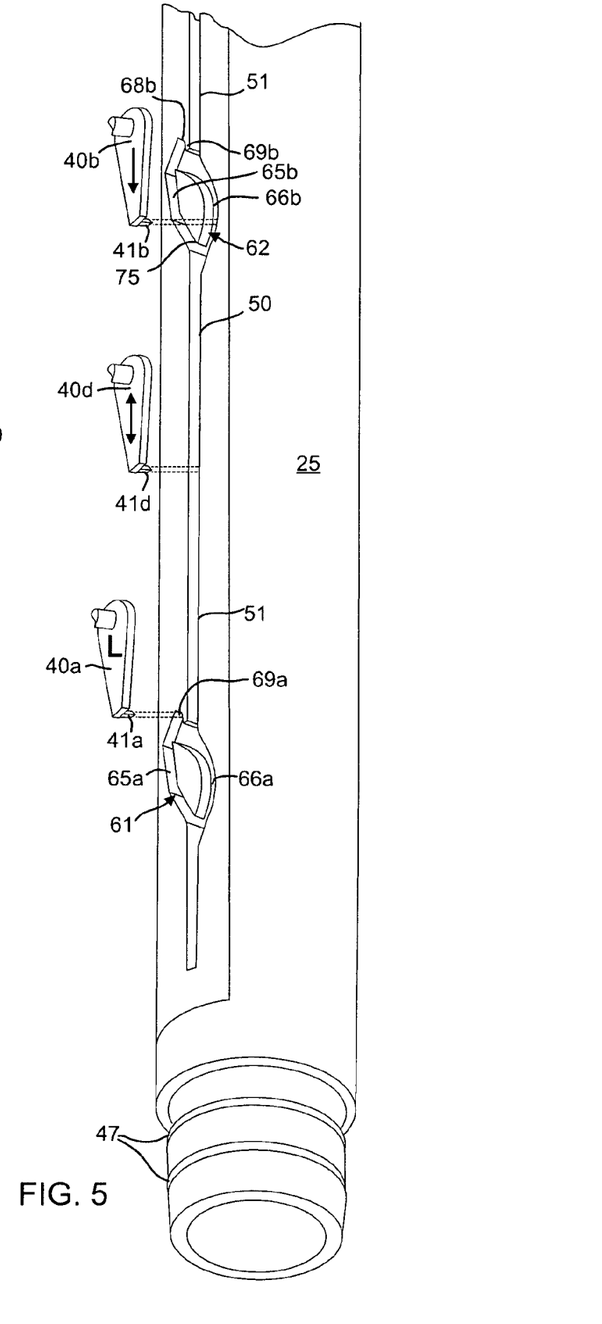
FIG. 5 is an enlarged, perspective, fragmented view of a pole of the canister of FIG. 4.
Figure 6:
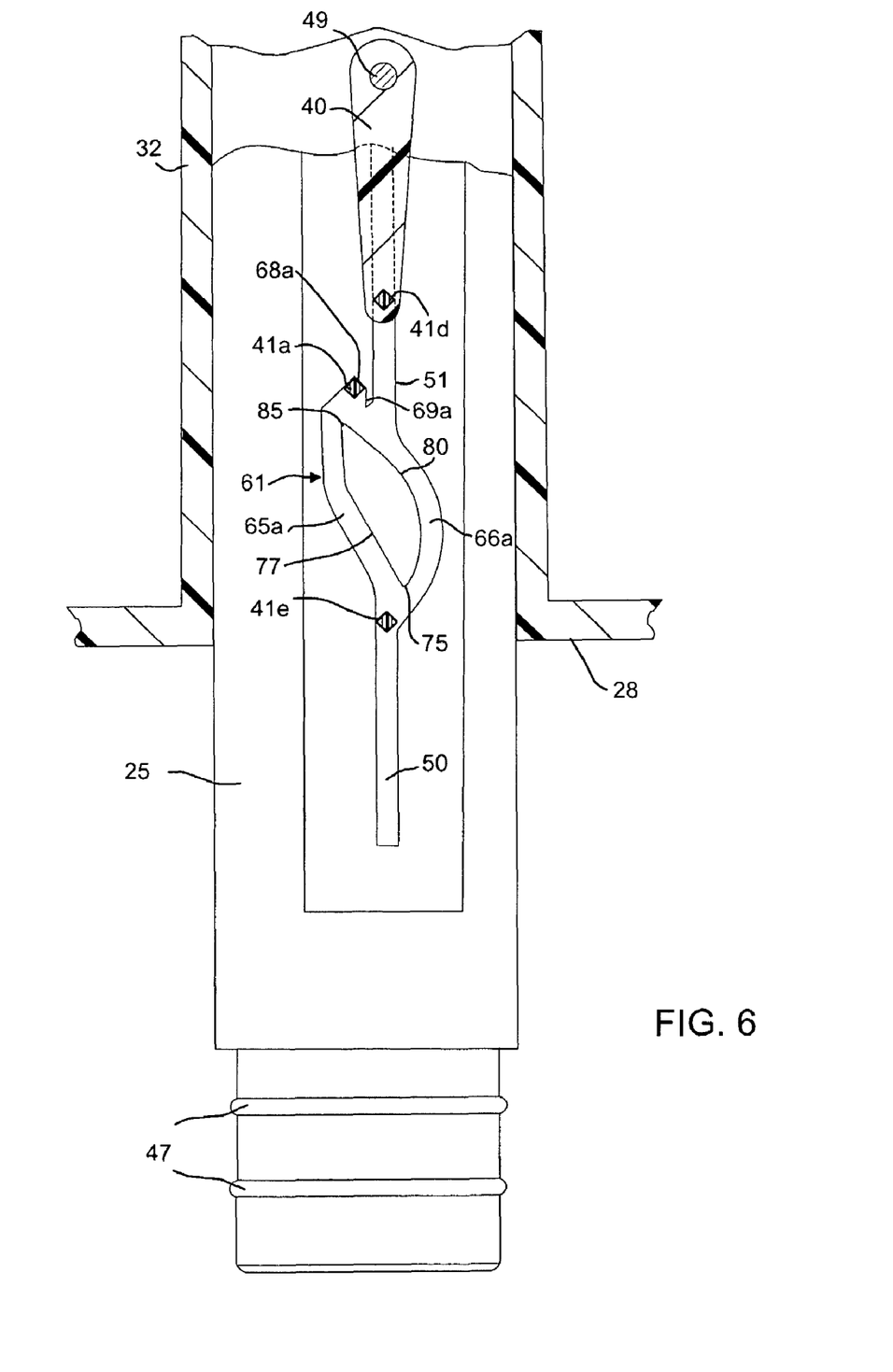
FIG. 6 is an enlarged section view of the pole taken at line 6-6 of FIG. 4.
Figure 7:
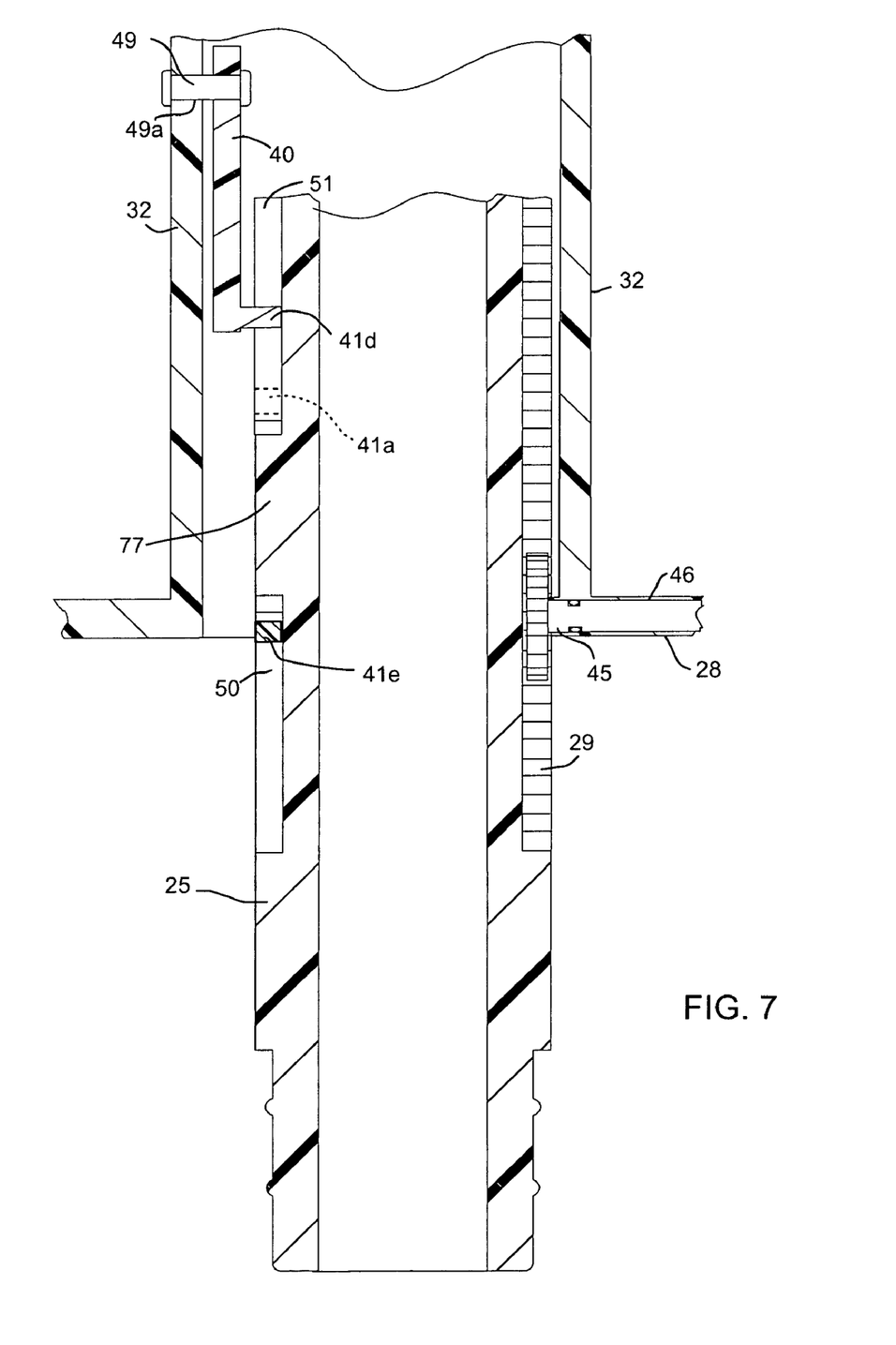
FIG. 7 is an enlarged section view of the pole taken at line 7-7 of FIG. 4.

In an embodiment, the canister will be assembled by mounting the internal base 23 to the base 17 and then fastening the pole 25 to the internal base 23. As shown in FIG. 5-7, the pole 25 includes annular rings 47 or other interference fit features that allow the pole 25 to be snap-fit into a bore in the support 22 (FIG. 2). The coil spring 27 is then placed onto the pole 25. The housing 15 is then assembled onto the base 23 by snap-fit of the tabs therein. The platform 30 is then assembled by attaching the swing arm 40 thereto. The swing arm 40 includes an axle 49 that is inserted into a hole 49 of the collar 32 (see FIG. 7) so that the arm 40 may swing freely on the collar 32. A pin 45 is mounted on the collar 32 on a side opposite the hole 49a (about 180°). The pin 45 is attached to the collar 32 by inserting the pin 45 through an aperture 46 (FIG. 7) in the collar 32. The platform 30 is then placed over the pole 29 so that the pin 45 rides in slot 29 and the finger 41 rides in track 50. In an embodiment, the track 50 and slot 29 extend to the top edge 21 of the pole 25 so that the finger 41 and pin 45 may be slid into position, respectively. The cap 42 is attached to the top of the pole 29 to maintain the collar 32 and platform 30 in position on the pole 29. The bezel 44 is attached to the top edge 21 of the housing 15, the button 43 is attached to the lid 18 and the hinge 19 of the lid is attached to the bezel 44 and housing 15.

The operation of the canister 10 of an embodiment of the present invention will be discussed with respect to FIGS. 3-7. The guide track 50 is generally arranged vertically along one side of the pole extending between the base 17 and lid 18, when the pole is assembled within the canister 10. The guide track 50 includes a main vertical track 51. In an embodiment, three positioning stations 61, 62 and 63 are provided along the track 50. The track 50 at each positioning station 61, 62, 63 is bifurcated and includes an upward track 65a, b, c and a downward track 66a, b, c. In the embodiment shown, each positioning station 61, 62, 63 is separated by a distance equal to the height of a toilet paper roll. In alternate embodiments, the positioning stations may be separated by varying distances, include more or less than three stations and be operative for other types of items. Each positioning station 61, 62, 63 also includes a positioning member, such as a gate or notch 68a, b, c and detent 69a, b, c. The collar 32 has the swing arm 40 mounted thereon which includes the finger 41 at its terminal end which rides in the track 50.

Figures 4, 5A:
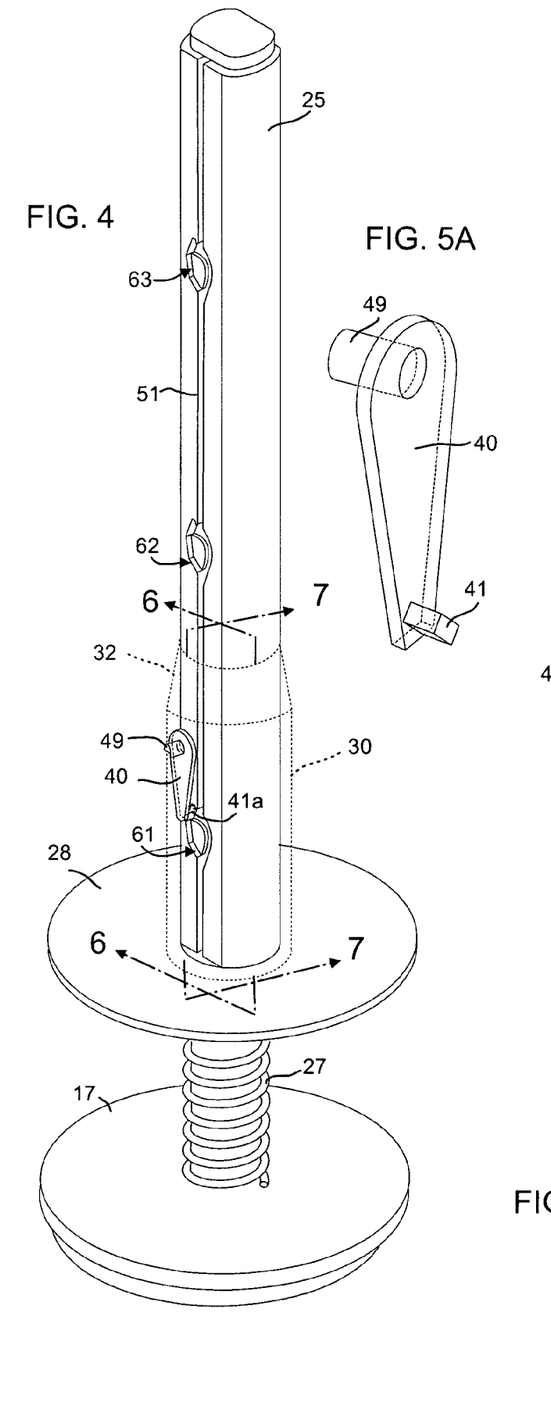
FIG. 4 is a perspective view of the internal components of FIG. 3.
FIG. 5a is an enlarged perspective view of a swing arm of the present invention.

FIGS. 3 and 4 depict the platform 30 locked in a first position with the finger 41 latched by first positioning member 69a. The multiple positions of the swing arm 40 and finger 41 are also depicted by the diamonds 41a, d, e shown in FIGS. 6 and 7 and the swing arms 40a, b, d depicted in FIG. 5. It is to be understood that these Figs. depict multiple arms 40a, b, d and fingers 41a, d, e, only to help illustrate how they may be positioned along the track 50 during operation of the canister. However, in an embodiment, there is only a single swing arm 40 having a single finger 41, as depicted in FIGS. 2 and 3. It is also to be understood that while only the first positioning station 61 is depicted in detail and described for FIG. 6, the second and third positioning stations 62, 63 may have the same construction and operate in a similar manner.

With the finger 41a received in the generally triangular shaped notch 68a and latched by positioning member 69a, the platform is prevented from moving upward along the pole 25. The finger 41a received by the positioning member 69a counteracts the bias force of the coil spring 27. Thus, it may be understood that when three toilet paper rolls 71, 72, 73 are placed on the pole 25, they are suspended by the platform 30 and locked in a first position with the uppermost roll 73 adjacent to the top of the canister 10 (as shown in FIG. 3). In an embodiment, the spring 27 is calibrated to provide a specific bias force in relation to the weight of the items to be placed on the platform 30. For example, if the dispenser 10 is designed to dispense three rolls of toilet paper 71, 72, 73, the standard weight of three rolls will be known and a calibrated spring used that will completely compress upon application of such a weight. Further, in an alternate embodiment, the calibrated spring will be designed to decompress by ⅓ upon removal of a first roll 71, by ⅔ upon removal of a second roll 72 and completely decompress upon removal of the final third roll 73. In other words, the calibrated spring may provide for the automatic indexing and positioning of items within the canister 10. In an embodiment, where the calibrated spring 27 cannot be fine tuned in order to precisely locate items in (three) predetermined positions, or the toilet paper rolls are not of a universal weight other indexing means, such as the finger 41 and positioning member 69, are provided in combination with such spring 27.

In order to move the platform 30 from the first position, a toilet paper roll 73 is removed from the upper most position by lifting the lid 18 and removing the roll 73. Just prior to removing the roll 73, a slight downward pressure is applied in order to push against the other rolls 71, 72, which in turn pushes the platform 30 slightly downward (in direction of Arrow D in FIG. 3). Such downward movement allows for the finger 41a to be moved downward away from the first positioning member 69a and out of the notch. As shown in FIG. 3, when the finger 41a is latched by the first positioning member 69a, the swing arm 40 is rotated (about 5° to the left). As the finger is freed from the member 69a, the swing arm 40 is allowed to freely move and the force of gravity will move the finger 41 into the main track 51 and the swing arm 40 is positioned in a vertical position. Upon removal of the upper most toilet paper roll 73, the platform 30 is then free to move upward due to the bias force of the spring 27. The platform 30 will move along the pole 25 and simultaneously the finger 41 (for example, finger 41d shown in FIG. 5) will ride in the main track 51 upward (as shown by Arrow U in FIG. 3) until the finger 41 reaches the second positioning station 62.

At the second positioning station 62 the finger 41 (for example, finger 41e in FIG. 6) will reach a lower apex point 75 (see FIG. 6). (It is to be understood that while FIG. 6 depicts the first positioning station 61, its features, such as apex 75, etc., are present in the second and third positioning stations 62, 63 and will be described with respect to FIG. 6). The lower apex 75 acts to bifurcate the track 51 and forms the upward track 65a, b, c and the downward track 66a, b, c. An upper apex 85 includes a slanted surface 80 which also forms the downward track 66a, b, c in part. An island 81 is formed between the upward and downward tracks 65, 66 and includes upper and lower apex 85, 75, the inclined surface 77 and slanted surface 80.

The apex 75 is offset to the (right) side of the longitudinal axis of the main track 51, so that when the finger 41 continues riding upward along the main track, it will abut against the apex 75 and an inclined surface 77 that will cause the finger to travel into the upward track 65b. At the top of the upward track 65b is a positioning member 69b. In an embodiment, the finger 41b may have a diamond shape cross-section and a notch 68b formed by positioning member 69b also has a corresponding triangle shape to the finger 41 in order to make a secure engagement (see FIG. 5). Thus, it is to be understood that it is also a feature of the present invention that the finger 41 have a predetermined interaction shape so that it interacts with the features and surfaces of the track 50 in order to control the path that the finger 41 follows along the track 50. For example, the diamond interaction shape of the finger 41e allows for it to abut the inclined surface 77 so that the upper edge of the diamond shape will slide easily along the inclined surface 77 and move the swing arm 40 to the left and into the upward track 65a (as shown in FIG. 6). Other interaction shapes may be provided that can control the path of the finger 41 in differently configured tracks 50 for canisters having other functions. It may also be understood that other shaped fingers 41 and positioning members 69 may be provided which will cause the finger to securely latch at the positioning member area 69. The bias force of the spring will push the finger 41 upward against the positioning member 69 and cause it to latch in place in the second position at the second positioning station 62.

When the second roll of toilet paper 72 has been used up, the platform 30 may be released from its second position 62 by pushing down slightly on the top roll 72 so that the finger 41 of the swing arm 40 is removed from the notch 69b, as discussed for the first positioning station 61 above. The swing arm 40 and the platform 30 ride upward along the main track 51 to the third positioning station 63 due to biasing by the spring 27. The finger 41 will ride the upward track 65c and be locked by positioning member 69c.

After the third roll of toilet paper 73 is used, the roll is removed and three new rolls may be placed in the canister 10. The weight of the three rolls 71, 72, 73 and/or pushing down by a user's hand causes the platform 30 to move downward along the track 50. At each station 61, 62, 63, the swing arm follows each of the downward tracks 66a, b, c due to the slanted track surface 80 (see FIG. 6) engaging the diamond shaped finger 41 to push the finger 41b (to the right as shown in FIG. 5). The upper apex point 85 (FIG. 6) is offset (to the left) away from the longitudinal axis of the main track 51, so that the finger 41d bypasses the upward track 65a and the positioning member 69a and is received by the downward track 66a (as shown in FIG. 6). Each station 61, 62, 63 guides the finger 41 downward until the swing arm 40 reaches the first (lowermost) station 61. In an embodiment, removal of the downward force against the platform 30 and spring 27 allows the finger 41 to be reset at notch 69a.

As shown in FIG. 7, the platform 30 and collar 32 are maintained in position, in order to prevent rotation so that the finger 41 can operate smoothly within the track 50, by an engagement member 45 riding in slot 29. In an embodiment, the engagement member 45 includes a friction bearing member that slows the travel of the platform 30. The member 45 may for example include a gear 45 and the slot is a toothed track 29. The gear 45 may have damping grease in order to provide friction and slow the rotation of the gear 45 which in turn will slow the travel of the platform 30 up and down the pole 25. Such a friction bearing member 45 may prevent any potential rebound action of the spring 27 when the platform 30 is at the top or bottom of the pole 25, in order to impede self actuation of the finger 41 in the track 50. The friction bearing member 45 also provides a means to slow the platform 30 in order to reduce wear on the finger 41. In an alternate embodiment, the engagement member 45 may include a pin that is inserted through an aperture in the collar of the platform and the pin rides in the guide slot in order to maintain the platform and collar in a single axial position.

Thus, it is to be understood that the present invention provides for a canister and an indexing apparatus that provides for automatic positioning of items in predetermined indexed positions when items are added or removed therefrom, without need of an external tab or positioning member to be adjusted by a user's hand. Merely by adding or removing the items to or from the canister, the items are automatically positioned.

The matter set forth in the foregoing description and accompanying descriptions is offered by way of illustration only and not as a limitation. While particular embodiments have been shown and described, it will be obvious to those skilled in the art that changes and modifications may be made without departing from the broader aspects of applicant's contribution. The actual scope of the protection sought is intended to be defined in the following claims when viewed in their perspective when based on the prior art.

What is claimed is:

1. A canister comprising:
   a vertical pole having a track with a positioning member;
   a platform including a collar having a bore for mounting over the pole and a finger protruding from the collar and received in the track; and
   a spring disposed on the pole for biasing the platform and the finger engaging the positioning member in order to counteract the force of the spring and hold the platform in a predetermined position along the track.

2. The canister of claim 1 wherein the positioning member includes a notch and a detent.

3. The canister of claim 1 wherein the platform includes a rim that receives rolls of toilet paper that are placed over the pole and onto the platform and the positioning members are separated a distance approximately equal to a height of the rolls so that upon removal of the rolls, each roll may be located adjacent a top of the canister and dispensed therefrom.

4. The canister of claim 1 wherein the track extends along the length of the pole between a lid and a base and includes at least two positioning stations where the track is bifurcated and each station having the positioning member.

5. The canister of claim 1 wherein the vertical pole includes a slot for receiving an engagement member of the platform in order to prevent rotation of the platform with respect to the pole and the engagement member creating friction against the pole in order to limit the speed that the platform travels on the pole.

6. The canister of claim 1 further comprising a swing arm pivotally attached to the collar and the swing arm has the finger protruding transverse to the arm at its terminal end for riding in the track.

7. The canister of claim 6 wherein the finger has an interaction shape in order to engage and interact with a corresponding shaped portion of the track.

8. The canister of claim 7 wherein the finger is diamond shaped and is locked by a first positioning member that holds the platform in a first position on the pole within the canister.

9. The canister of claim 8 further comprising a plurality of toilet paper rolls mounted on the platform and wherein upon removal of the uppermost roll of toilet paper and pushing down slightly on the platform, the diamond shaped finger is pushed downward away from the first positioning member in order to allow the platform to move upward.

10. The canister of claim 1 further comprising at least two positioning stations and each positioning station includes a positioning member, an upward track and a bifurcated downward track.

11. The canister of claim 10 further comprising a main vertical track extending between positioning stations and the upward track and downward track of the first station meet at an apex that forms a slanted surface which engages the finger that pushes the finger toward the downward track so that the platform may ride downward toward the next positioning station.

12. The canister of claim 11 wherein the first station includes an inclined surface that will force the finger into the upward track and toward a positioning member for receiving the finger in order to lock the platform in position.

13. The canister of claim 12 wherein the platform may be released from the positioning station by pushing down slightly on the platform so that the finger of the swing arm is released by the positioning member allowing the swing arm to move the arm to a vertical position so that its finger locates in the main track and the platform may ride upward along the main track.

14. The canister of claim 12 wherein upon pushing down on the platform to move it downward along the track, the swing arm's finger engages the slanted surface so that the finger rides in the downward track until the swing arm reaches the next station.

15. The canister of claim 3 wherein the finger locates the platform at a first station so that the plurality of toilet paper rolls may be suspended in position inside the canister.

16. An indexing apparatus comprising:
   a rod having a guide track;
   a platform disposed on the rod and the platform having a finger with an interaction shape;
   a calibrated bias member actuating the platform; and
   a positioning member working in combination with the interaction finger and the calibrated bias member in order to index the platform between at least three positions.

17. A method of dispensing an item from a canister comprising the steps of:
   providing a vertical pole having a track with a plurality of positioning members;
   mounting a platform on the pole, the platform having a collar with a finger protruding therefrom and received in the track and engaged by a first positioning member in order to lock the platform in a first position;
   pushing downward on the platform in order to release the finger from the fast positioning member;
   biasing the platform upward by a spring causing the finger to ride upward in the track; and
   engaging the finger by a second positioning member in order to lock the platform in a second position.

18. The method of claim 17 further comprising the steps of:
   engaging the finger at an interaction surface of the track provided by a bifurcated section of the track forming a first positioning station; and
   guiding the finger into an upward track or downward track.

19. The method of claim 18 further comprising the steps of:
   guiding the finger into a downward track while pushing the platform down; and guiding the finger into the upward track via the bias force of the spring pushing the platform upward.

20. The method of claim 19 further comprising the step of:

loading at least two toilet paper rolls on the platform and pushing the platform downward;

latching the finger by a first positioning member so that the top roll that is stacked on a lower roll and is located adjacent a top of the canister and the platform is locked in a first position;

removing the top roll by pushing down slightly in order to release the finger from the first positioning member;

reorienting the finger that is attached to a swing arm to allow the swing arm to move to a vertical position and locating the finger along a main track;

moving the platform and the lower roll upward along the pole via the finger riding the main track in order to reposition the lower roll at the top of the canister; and latching the finger by a second positioning member in order to lock the platform in a second position.

* * * * *

UNITED STATES PATENT AND TRADEMARK OFFICE
CERTIFICATE OF CORRECTION

PATENT NO. : 7,287,667 B2
APPLICATION NO. : 11/128833
DATED : October 30, 2007
INVENTOR(S) : Keith DeLawrence Brown and Michael Circosta Page 1 of 1

It is certified that error appears in the above-identified patent and that said Letters Patent is hereby corrected as shown below:

<u>Column 8</u>

Claim 17; line 51 "fast" should be --first--.

Signed and Sealed this

Fifteenth Day of April, 2008

JON W. DUDAS
*Director of the United States Patent and Trademark Office*